United States Patent
Liu et al.

(10) Patent No.: US 6,199,041 B1
(45) Date of Patent: Mar. 6, 2001

(54) SYSTEM AND METHOD FOR SAMPLING RATE TRANSFORMATION IN SPEECH RECOGNITION

(75) Inventors: Fu-Hua Liu, Scarsdale; Michael A. Picheny, White Plains, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/197,024

(22) Filed: Nov. 20, 1998

(51) Int. Cl.[7] .................................................. G10L 15/00
(52) U.S. Cl. .......................... 704/231; 704/204; 704/203; 704/234; 704/237
(58) Field of Search .................................... 704/200, 202, 704/211, 219, 231, 236, 241, 246, 247, 265, 267, 258, 252, 205, 234, 237, 203, 204

(56) References Cited

U.S. PATENT DOCUMENTS

| | | | |
|---|---|---|---|
| 5,165,008 | * 11/1992 | Hermansky et al. | 704/262 |
| 5,581,653 | * 12/1996 | Todd | 704/229 |
| 5,732,394 | * 3/1998 | Nakadai et al. | 704/255 |
| 5,809,459 | * 9/1998 | Bergstrom et al. | 704/223 |
| 5,857,000 | * 1/1999 | Jar-Ferr et al. | 704/203 |
| 5,913,188 | * 6/1999 | Tzirkel-Hancock | 704/223 |

OTHER PUBLICATIONS

Haeb–Umbach et al (R. Haeb–Umbach, X. Aubert, P. Beyerlein, D. Klakow, M. Ullrich, A. Wendemuth, P. Wilcox, "Acoustic Modeling in the Philips Hub–4 Continuous–Speech Recognition System," DARPA Broadcast News, Transcription & Understanding Workshop, Feb. 1998.*

Parrott (Parrott Systems, Inc., Internet web page "http://www.say-parrot.com/us/technology/algorithms/recognition/index.html," Feb. 2000).*

Padmanabhan et al (M. Padmanabhan, L.R. Bahl, D. Nahamoo, M. Picheny, "Speaker Clustering and Transformation for Speaker Adaptation in Speech Recognition Systems", IEEE Transactions on Speech and Audio Processing, Jan. 1998).*

Bahl et al., "Performance of the IBM Large Vocabulary Continuous Speech Recognition System on the ARPA Wall Street Journal Task," ICASSP–95, 1995.

Davis et al., "Comparison of Parametric Representation for Monosyllabic Word Recognition in Continuously Spoken Sentences", IEEE Trans. on ASSP, vol. 28, pp. 357–366, 1980.

* cited by examiner

Primary Examiner—Richemond Dorvil
Assistant Examiner—Daniel A. Nolan
(74) Attorney, Agent, or Firm—F. Chau & Associates, LLP

(57) ABSTRACT

A method and system for transforming a sampling rate in speech recognition systems, in accordance with the present invention, includes the steps of providing cepstral based data including utterances comprised of segments at a reference frequency, the segments being represented by cepstral vector coefficients, converting the cepstral vector coefficients to energy bands in logarithmic spectra, filtering the energy bands of the logarithmic spectra to remove energy bands having a frequency above a predetermined portion of a target frequency and converting the filtered logarithmic spectra to modified cepstral vector coefficients at the target frequency. Another method and system convert system prototypes for speech recognition systems from a reference frequency to a target frequency.

30 Claims, 2 Drawing Sheets

SYSTEM AND METHOD FOR SAMPLING RATE TRANSFORMATION IN SPEECH RECOGNITION

BACKGROUND OF THE INVENTION

1. Field of the Invention

The present invention relates to speech recognition and, more particularly, to a system and method for transforming sampling rates without retraining.

2. Description of the Related Art

Speech recognition can achieve the best performance when test or operating conditions match training conditions. In general, these matched conditions include acoustic environments, speakers, application corpora, etc. An issue arises in conventional systems when a sampling frequency mismatch occurs between the training conditions and the test/operating conditions. The frequency mismatch inevitably leads to severe performance degradation in speech recognition.

When a conventional speech recognition system is deployed, it is designed for a specific data sampling frequency. When another sampling rate is considered, it is customary to re-train the system for the new specific sampling rate. While it is straightforward to transform signals and retrain systems, this presents at least two major problems in many real-time applications. First, extra efforts are needed to supply training data at the new sampling frequency by either collecting new data or transforming existing training data. Second, the training process must be repeated to generate new system parameters.

For systems that have undergone calibration processes such as speaker adaptation or acoustic adaptation, it is even more tedious to repeat the processes, let alone the complication of maintaining multiple prototypes.

Therefore, a need exists for a system and method for providing sampling frequency change without the burden of retraining.

SUMMARY OF THE INVENTION

A method for transforming a sampling rate in speech recognition systems is disclosed which may be implemented by a program storage device readable by machine, tangibly embodying a program of instructions executable by the machine to perform method steps for transforming a sampling rate in speech recognition systems, the method steps which may be implemented by the program storage device include providing cepstral based data including utterances comprised of segments at a reference frequency, the segments being represented by cepstral vector coefficients, converting the cepstral vector coefficients to energy bands in logarithmic spectra, filtering the energy bands of the logarithmic spectra to remove energy bands having a frequency above a predetermined portion of a target frequency and converting the filtered logarithmic spectra to modified cepstral vector coefficients at the target frequency.

In alternate methods which may be executed by the program storage device, each energy band may be associated with a mel-filter, and the step of filtering may further include the step of rescaling the mel-filters. The step of converting the cepstral vector coefficients to energy bands in logarithmic spectra may include converting the cepstral vector coefficients to energy bands in logarithmic spectra by employing an inverse discrete cosine transform (IDCT). The step of filtering the energy bands may include the step of filtering the energy bands to remove energy bands above one-half the target frequency. The step of converting the filtered logarithmic spectra to modified cepstral vector coefficients at the target frequency may include the step of converting the filtered logarithmic spectra to modified cepstral vector coefficients at the target frequency by performing a discrete cosine transform (DCT). The method may further include the step of estimating maximum and mean values of segment energies at the reference frequency and at the target frequency. The method may further include the step of outputting a global maximum and mean at the reference frequency for denormalizing system prototypes of a speech recognition system. The method may further include the step of outputting a global maximum and mean at the target frequency for energy normalization of system prototypes of a speech recognition system.

Another method for transforming a sampling rate in speech recognition systems is disclosed which may be implemented by a program storage device readable by machine, tangibly embodying a program of instructions executable by the machine to perform method steps for transforming a sampling rate in speech recognition systems, the method steps which may be implemented by the program storage device include providing system prototypes including distributions of normalized cepstral vectors at a reference frequency, denormalizing the normalized cepstral vectors at the reference frequency, converting the denormalized to energy bands in logarithmic spectra, filtering the energy bands of the logarithmic spectra to truncate energy bands having a frequency above a predetermined portion of a target frequency, converting the filtered energy bands to modified cepstral vectors and normalizing the modified cepstral vectors at the target frequency such that the system prototypes are sampled at the target frequency.

In alternate methods which may be executed by the program storage device, each energy band is associated with a mel-filter, and the step of filtering may further include the step of rescaling the mel-filters. The step of converting the denormalized to energy bands in logarithmic spectra may include converting the denormalized to energy bands in logarithmic spectra by employing an inverse discrete cosine transform (IDCT). The step of filtering the energy bands may include the step of filtering the energy bands to remove energy bands above one-half the target frequency. The step of converting the filtered energy bands to modified cepstral vectors may include the step of converting the filtered energy bands to modified cepstral vectors by performing a discrete cosine transform (DCT). The step of denormalizing the normalized cepstral vectors at the reference frequency may further include the step of inputting global maximum and mean values of segment energies at the reference frequency to denormalize the normalized cepstral vectors of the system prototypes at the reference frequency. The step of normalizing the modified cepstral vectors may further include the step of inputting global maximum and mean values of segment energies at the target frequency to normalize the cepstral vectors of the system prototypes at the target frequency.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to speech recognition and, more particularly, to a system and method for transforming sampling rates without retraining. The present invention includes an algorithm providing Sampling Rate Transformation (SRT) to address the issue of frequency mismatch. When a recognition task needs a different sampling frequency from that of the reference system, it is customary to retrain the system for the new sampling rate. To circumvent the tedious training process, the present invention performs the transformation directly on the speech recognition system. By resealing a mel-filter design and filtering the system in the spectrum domain, SRT converts the existing system to operate at a target spectral range.

Figure 2:
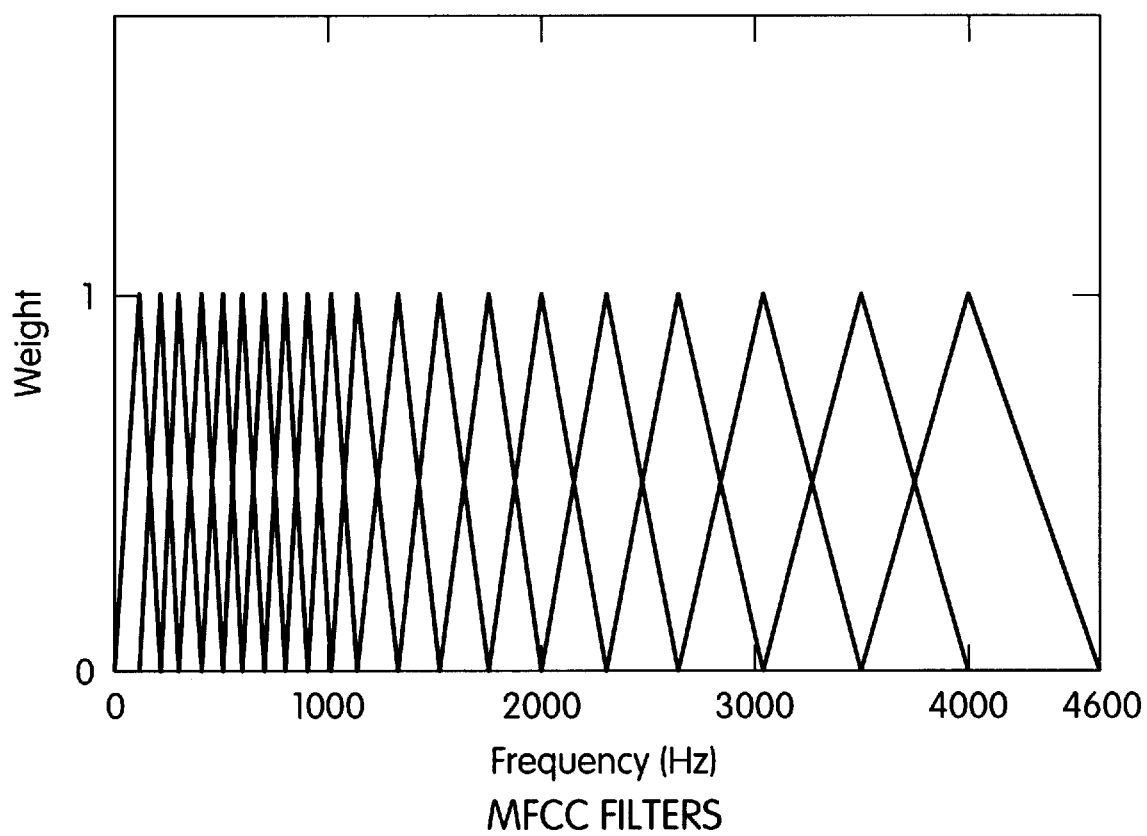
FIG. 2 is an illustration of mel-filters for generating mel-frequency cepstrum coefficients in accordance with the prior art.

The invention begins with an existing reference system trained for a reference sampling frequency. By undoing the energy-normalization processing and performing an inverse discrete cosine transform on the existing cepstral Gaussian distributions, corresponding Gaussian distributions may be obtained in the log-spectral domain. The log-spectral domain is preferably in a form of output from mel filters, which are known in the art and illustratively shown in FIG. 2. The log-spectral distributions are filtered by truncating frequencies above a predetermined portion of the new (target) sampling rate. Then, discrete cosine transformation and energy normalization are applied to these filtered distributions to create a new speech recognition system for the target sampling frequency. The same mel-filter design may be used for both reference and target frequencies by mel filter resealing. In accordance with the invention, the reference system may be used directly for all sampling frequencies without retraining.

Advantageously, new systems are obtained without using any data from a test environment. Preliminary experiments performed by the inventors show that SRT in accordance with the invention significantly reduces word error rate when frequency mismatch occurs.

Conventionally, interpolation and decimation have been used to change the sampling rate for data in speech recognition systems. However, the frequency conversion process is predominantly applied directly to waveform signals. In contrast, a frequency conversion process in accordance with the invention, may be applied directly to recognition systems. Sampling rate transformation (SRT) performs "downsampling" or "upsampling" directly on a recognition system while leaving the sampling frequency of test data unchanged. In other words, the sampling rate transformation converts a cepstral-based system that is designated for one particular frequency to another frequency.

The SRT algorithm may be applied to both downsampling and upsampling cases, similar to techniques implemented in time-domain applications. However, downsampling serves more practical and useful purposes than upsampling for speech recognition. Therefore, although upsampling may be performed in accordance with the present invention, the following disclosure focuses on the case of downsampling. Frequency transformation on cepstral-based signal data is performed in accordance with the invention as shown on a left hand side (LHS) of line "A" of FIG. 1 and described herein as follows. Let $\{\vec{x}[t], t=1,T\}$ be a sequence of vectors of mel-frequency cepstral coefficient (MFCC) as described in S.B. Davis, and P. Mermelstein, "Comparison of Parametric Representations for Monosyllabic Word Recognition in Continuously Spoken Sentences", IEEE Trans. on ASSP, Vol. 28, pages 65–74, 1980, incorporated herein by reference and illustratively shown in FIG. 2, for an utterance of length T segments with a sampling frequency, $f_{ref}$. It is to be understood that mean, covariance and other vectors described herein preferably include 3×D dimensions, where D may be a 13, which may be decomposed into three D-component subvectors including static cepstral coefficients, first order delta cepstral coefficients and second order delta cepstral coefficients designated by the subscripts c, d and dd, respectively. These components preferably include D dimensions each. A log-spectral representation of the signal may be written as $$\vec{X}[t]=\text{IDCT}\{\vec{x}[t]\}, t=1,T \quad (1)$$

where IDCT is the inverse discrete cosine transform (IDCT) and t represents individual time frames (i.e., segments). Other compatible transformation functions may be used. In this case, each $\vec{X}[t]$ is a series of band energies corresponding to a value of t, including N energy bands, for example N=24, from N individual mel-filters. Therefore, for T segments, there are N mel-filters for each segment, each mel-filter having its own band energy associated therewith (See, for example, FIG. 2).

A downsampled version of signal $\vec{X}[t]$ for the new frequency, $f_{new}$, may be obtained by discarding all filters above the new Nyquist frequency, for example $f_{new}/2$. The new signal is represented as $$\vec{Y}[t]=W\times\vec{X}[t], t=1,T \quad (2)$$

where W is a rectangular-window filter with a cutoff frequency at the Nyquist frequency of the target sampling rate, for example 5.5 kHz for an 11 kHz target frequency. The MFCC vectors for the downsampled version of the signal with a new frequency, $f_{new}$, can be computed by discrete cosine transform (DCT) as:

$$\vec{y}[t]=\text{DCT}\{\vec{Y}[t]\}, t=1,T \quad (3)$$

Furthermore, based on Equations (1), (2), (3), the overall transformation may be rewritten as:

$$\vec{y}[t]=\text{DCT}\{\vec{Y}[t]\}=\text{DCT}\{W\times\text{IDCT}\{\vec{x}[t]\}\}=A\times W\times C\times\vec{x}[t]=S\times\vec{x}[t] \quad (4)$$

where A and C are matrices for DCT and IDCT, respectively. In other words, the frequency transformation may be characterized by matrix operation as shown in Equation (4). Other transformation functions may be used. It is noted that the downsampled cepstral vectors $\{\vec{y}[t], t=1,T\}$ share the same filters as the original cepstral vectors, $\{\vec{x}[t], t=1, T\}$. What this implies is that the design of mel-filters will remain the same regardless of the target sampling rate. To this end, a reference sampling frequency, usually the one of training data, is used to design the cutoff frequencies for all mel-filters. When test data sampled at another sampling frequency is to be processed, data points from a fast Fourier transform (FFT) may be aligned to their corresponding filter designed based on the reference frequency with a linear warping. This is a process for mel-filter resealing.

Figure 1:
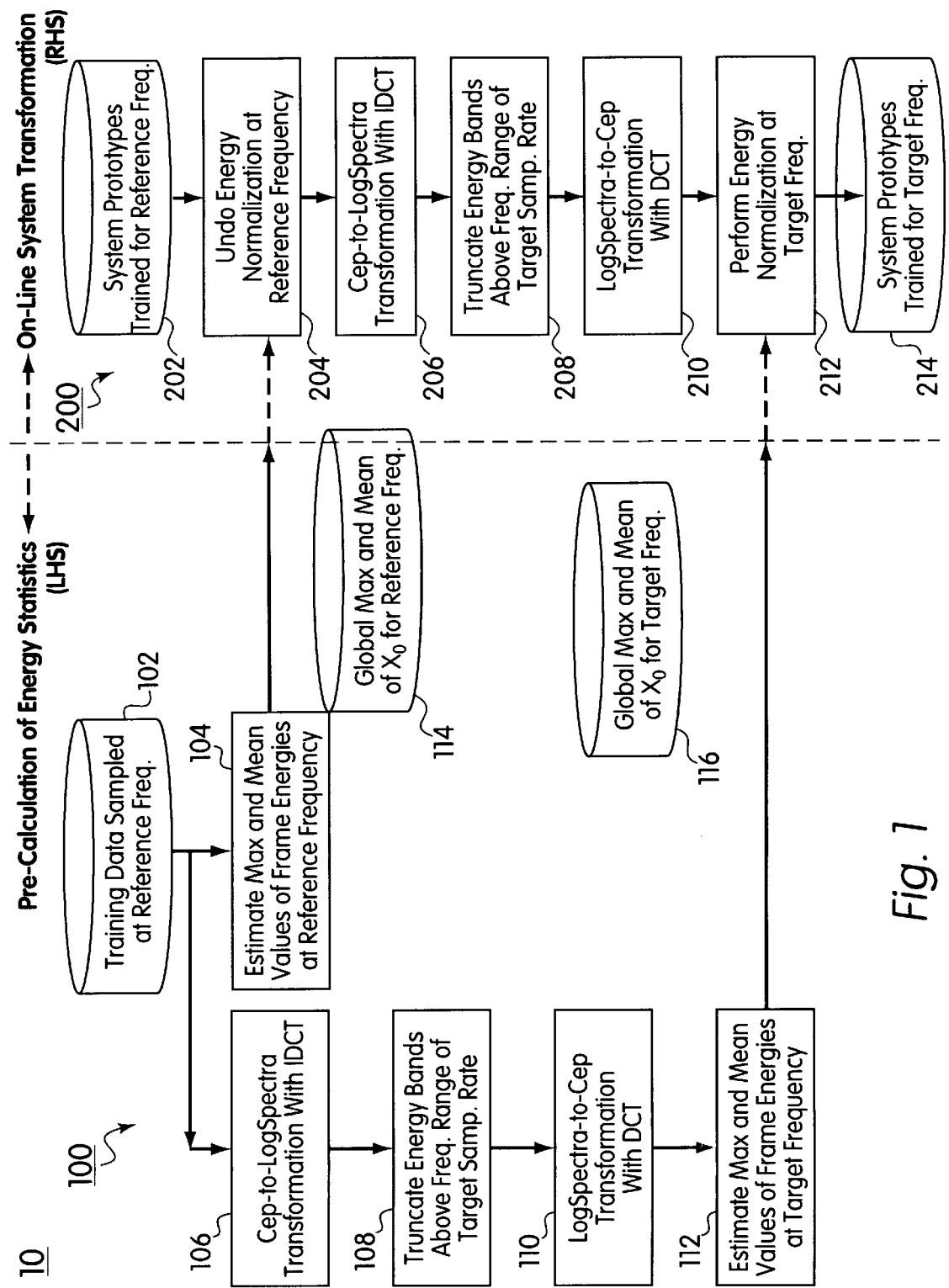
FIG. 1 is a flow/block diagram showing a system/method for transforming sampling rates in accordance with the present invention.

Frequency transformation on cepstral-based Gaussian models is now described as shown for the right hand side (RHS) of line "A" of FIG. 1. Equation (4) describes frequency transformation on cepstral vectors of the signal data and also serves as a fundamental block for frequency transformation on cepstral Gaussian distributions. However, when it comes to the speech recognition models, more issues need to be addressed. Many state-of-the-art recognition systems utilize static cepstral vectors and their first-order and second-order time derivatives as the features. In addition, many systems seek to reduce speaker and environment variability by utilizing cepstral mean normalization (CMN) plus energy normalization. These normalizations become a technical barrier preventing resampling on the recognition systems themselves. These normalizations include energy normalization which is applied to an energy component ($X_0$) with respect to a maximum value of energy taken on a sentence-by sentence basis, that is, the energy component $X_0$ is normalized for segments in a sentence by performing a normalization relative to the maximum energy component value for that sentence. Cepstral mean normalization is applied to all cepstral components except the energy component, that is, normalization is performed using the average value of the components in the sentence to normalize the cepstral components. This is also preformed on a sentence-by-sentence basis. Therefore, to reverse these normalizations, sentence based maximum and average values should be made available. In conventional systems, both the maximum values of energy and average values of cepstral components are discarded after normalization. In accordance with the present invention, the maximum values of energy and mean values of cepstral components are provided using a global value. Sampling rate transformation is derived on a typical recognition system that also employs dynamic cepstral features from time derivatives and CMN along with energy normalization of automatic gain control with respect to maximum value (AGC-max).

Let $\{\mu_{x[i]}, i=1, M\}$ and $\{\Sigma_{x[i]}, i=1, M\}$ represent the mean vectors and co-variance matrices of a set of M Gaussian distributions in a recognition system with a sampling frequency, $f_{ref}$.

Let $\vec{x}_{norm}[t]=[\vec{x}_{norm,c}[t], \vec{x}_{norm,d}[t], \vec{x}_{norm,dd}[t]]^T$ be the extended vector normalized with CMN and AGC-max. Furthermore, let AGC-max be written as $x_{norm,0}[t]=g \times x_0[t]+b(max(x_0))$ where g is the gain, $x_0[t]$ is the value of energy at segment t and $b(max(x_0))$ is the shift due to AGC-max. The static part of the extended observation $\vec{X}_{norm}[t]$ can be expressed as $$\vec{x}_{norm,c}[t] = G \times \left(\vec{x}_c[t] - \frac{1}{T}\sum_t \vec{x}_c[t] + \vec{b}_{ref}\right) \quad (5)$$

$$G = \begin{bmatrix} g & 0 & \ldots & 0 \\ 0 & 1 & \ldots & 0 \\ \ldots & \ldots & \ldots & 0 \\ 0 & 0 & \ldots & 1 \end{bmatrix} \quad \vec{b}_{ref} = \begin{bmatrix} f(max(x_0), mean(x_0)) \\ 0 \\ 0 \\ \ldots \\ 0 \end{bmatrix}$$

From Equations (4) and (5), the corresponding normalized vector for new sampling rate can now be re-written as $$\vec{y}_{norm,c}[t]=G \times S \times (G^{-1} \times \vec{x}_{norm,c}[t] - \vec{b}_{ref}) + G \times \vec{b}_{new} \quad (6)$$

Note that $\vec{b}_{ref}$ and $\vec{b}_{new}$ are sentence-based shift vectors from AGC-max for the original and new sampling rates, respectively. Similarly, the corresponding dynamic features for new frequency can be written as $$\vec{y}_{norm,d}[t]=G \times S \times G^{-1} \times \vec{x}_{norm,d}[t]$$

$$\vec{y}_{norm,dd}[t]=G \times S \times G^{-1} \times \vec{x}_{norm,dd}[t] \quad (7)$$

Because the sentence-based maximum values of the energy are discarded for typical speech recognition systems, the present invention provides a global maximum value, which may be pre-computed for every new target frequency from training data, in the place of sentence-based values. Let sentence-based shifts, $\vec{b}_{ref}$ and $\vec{b}_{new}$, be replaced by global shifts, $\overline{\vec{b}_{ref}}$ and $\overline{\vec{b}_{new}}$. The static and dynamic features in the mean vectors for new frequency can be expressed as $$\mu_{\vec{x}_{denorm,c}}[i]=G^{-1} \times \mu_{\vec{x}_{norm,c}}[i] - \overline{\vec{b}_{ref}} \quad (8a)$$

$$\mu_{\vec{x}_{trunc,c}}[i]=S \times \mu_{\vec{x}_{denorm,c}}[i] \quad (8b)$$

$$\mu_{\vec{y}_{norm,c}}[i]=G \times \mu_{\vec{x}_{trunc,c}}[i]+G \times \overline{\vec{b}_{new}} \quad (8c)$$

$$\mu_{\vec{y}_{norm,d}}[i]=G \times S \times G^{-1} \times \mu_{\vec{x}_{norm,d}}[i] \quad (8d)$$

$$\mu_{\vec{y}_{norm,dd}}[i]=G \times S \times G^{-1} \times \mu_{\vec{x}_{norm,dd}}[i] \quad (8e)$$

It can be easily shown that the co-variance matrix for new frequency can be described as:

$$\Sigma_{\vec{y}_{norm}}[i]=G \times S \times G^{-1} \times \Sigma_{\vec{x}_{norm}}[i] \times (G \times S \times G^{-1})^T \quad (9)$$

It should be understood that the elements shown in FIG. 1 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a flow/block diagram is shown for a method/system, referred to generally as system 10 composed of systems 100 and 200, for transforming sampling rates in speech recognition systems in accordance with the present invention. FIG. 1 shows the capability of system 100 to perform transformation of training data (to the left of line "A"). Training data transformation and system prototype transformation may be performed independently of each other. However, FIG. 1 shows both types of systems combined in an example of a preferred embodiment indicated generally as system 10. In block 102, training data is provided which is sampled at a reference frequency. In block 104, the training data 102 is used to estimate maximum and mean values of segment energies (also called frame energies) at the reference frequency $f_{ref}$. Global mean and max values are output (max and mean of $X_0$) in block 114 for $\overline{\vec{b}_{ref}}$ and the results are transferred to block 204. In block 106, training data 102 is input for converting cepstral based signals to log spectra preferably using IDCT according to Equation (1). In block 108, energy bands are filtered and truncated if, for example, the energy bands include frequencies above the new Nyquist frequency This may be performed using Equation (2). In block 110, a log spectra to cepstral transformation is performed preferably using DCT in accordance with Equation (3). The transformation computes MCFF vectors for mel-filters at $f_{new}$.

In blocks 112 and 116, the maximum and mean values of segment energies (also called frame energies) are estimated at the target frequency $f_{new}$. Global mean and max values are output(max and mean of $X_0$) in block 116 for $\overline{b}_{new}$ and the results are transferred to block 212. Block 212 will be described in more detail below for the transformation of sampling rate for the system prototypes.

For system 200 (for the transformation of system prototypes or models to the right of line "A"), system prototypes are provided in block 202 which were trained at the reference frequency. In block 204, frame energy values determined in blocks 104 and 114 are input so that energy normalization at the reference frequency is converted back to its original denormalized form (according to Equation (8a) so that further processing may be performed on the system prototypes. Blocks 206, 208 and 210, perform the same operations as blocks 106, 108 and 110. Block 210 outputs to block 212 where the cepstral data along with the global (block 116) and estimated values (block 112) are used to perform an energy normalization at the target frequency. Equation (8c) is preferably used to perform the energy normalization in block 212. In block 214, system prototypes are output which are to be operated at the target frequency. Advantageously, according to the present invention, the speech recognition system has now had its sampling rate transformed from the reference frequency to the target frequency without retraining the system.

EXPERIMENTAL RESULTS

A state-of-the art IBM large-vocabulary continuous speech recognition as described in L.R. Bahl, et al, "Performance of the IBM Large Vocabulary Continuous Speech Recognition System on the ARPA Wall Street Journal Task", ICASSP-95, 1995, incorporated herein by reference, was used in the following experiments. Both training and test data were originally collected at 22 KHz. Experiments are carried out for 3 different processing frequencies, including 16 KHz, 11 KHz, and 8 KHZ. The test data includes 4 male and 6 female speakers. Each speaker recorded 61 utterances from a specific business office task. Each speaker also recorded 270 utterances for experiments of speaker adaptation.

Two speaker-independent (SI) baseline systems were established, one for 16 KHz sampling frequency and one for 11 KHz. Test data is also processed at the corresponding frequency. The word error rates (WER) for 16 KHz and 11 KHz baseline systems were 14.74% and 16.17%, respectively, as illustrated in the first two results in Table 1.

The baseline results reveal extra benefits using wider-band information as observed in the 16 KHz system. The 16 KHz system was, thereafter, used as the reference system while the 16 KHz frequency is referred to as the reference frequency in this disclosure. It is noted that the 16 KHz and 11 KHz systems share the same mel-filters design based on 16 KHz.

When the test data is processed at another target frequency, say 11 kHz for conventional applications, a frequency mismatch occurs.

Table 1 shows that the mismatch in frequency leads to a WER of 29.89%, twice the WER in reference system. When the SRT algorithm is applied, in accordance with the present invention, to downsample the reference recognition system for 11 KHz data, performance improves to 18.17% with SRT.

TABLE 1

Frequency mismatch and SRT in SI systems

| System | Signal Processing for Test Data | WER (%) |
|---|---|---|
| 16 KHz-SI | 16 KHz | 14.74 |
| 11 KHz-SI | 11 KHz | 16.17 |
| 16 KHz-SI | 11 KHz | 29.89 |
| SRT-SI (Mean Only) 16 KHz | 11 KHz | 18.17 |

To study the performance of SRT in conjunction with speaker adaptation, a speaker-adapted (SA) system is established using maximum likelihood linear regression (MLLR) and maximum a posteriori (MAP) techniques. The speaker-adapted (SA) system included 270 adaptation utterances for each speaker. For each sampling rate, a SA system is computed. Table 2 compares the performance of SRT in conjunction with speaker adaptation. It shows that SRT is also very effective in the speaker adaptation mode by reducing the WER from 15.48% to 9.71%, comparable to those from the matched systems. It is also interesting to note that the difference between 16 KHz and 11 KHz system is virtually flattened after speaker adaptation.

TABLE 2

Comparison of SRT in SA systems

| System | Signal Processing Test Data | WER (%) |
|---|---|---|
| 16 KHz-SA | 16 KHz | 9.28 |
| 11 KHz-SA | 11 KHz | 9.33 |
| 16 KHz-SA | 11 KHz | 15.48 |
| SRT-SA 16 KHz | 11 KHz | 9.71 |

SRT was also examined in narrow-band applications where the sampling frequency was set to 8 KHz. Table 3 shows that the frequency mismatch between 8 KHz and 16 KHz degrades the performance to 28.93%, much worse than its 11 KHz–16 KHz counterpart which is 15.48%. SRT is shown to be able to address the adverse impact from frequency mismatch with an impressive performance of 10.60%.

TABLE 3

Performance of SRT in 8 KHz with SA.

| System | Signal Processing Test Data | WER (%) |
|---|---|---|
| 16 KHz-SA | 16 KHz | 9.28 |
| 8 KHz-SA | 8 KHz | 10.83 |
| 16 KHz-SA | 8 KHz | 28.93 |
| SRT-SA 16 KHz | 8 KHz | 10.60 |

The correlation between frequency mismatch and the speaker's gender is also examined. Table 4 shows the results based on speaker's gender in SA systems. Table 4 reveals that female speakers are likely to be more susceptible to the frequency mismatch than male speakers. Similar comparisons were also observed in the SI systems.

TABLE 4

Breakdown results of SRT based on speaker's gender in SA system, with 4 male and 6 female speakers.

| System | Test Data | Total-WER | Male-WER | Female-WER |
|---|---|---|---|---|
| 16 KHz | 16 KHz | 9.28 | 8.48 | 9.82 |
| 11 KHz | 11 KHz | 9.33 | 8.35 | 9.98 |
| 16 KHz | 11 KHz | 15.48 | 9.92 | 19.19 |
| SRT 16 KHz | 11 KHz | 9.71 | 8.36 | 10.67 |
| 8 KHz | 8 KHz | 10.83 | 9.02 | 12.04 |
| 16 KHz | 8 KHz | 28.93 | 22.59 | 33.15 |
| SRT 16 KHz | 8 KHz | 10.60 | 9.29 | 11.47 |

In the present invention, the issue of different sampling frequencies in speech recognition is addressed. Severe performance degradation is observed when a sampling frequency mismatch occurs. A new approach is disclosed to reduce the adverse impact of mismatch. One significant advantage of SRT, in accordance with the invention, is that new systems are obtained without using any calibration data processed at the target frequency. Though, in this disclosure, SRT is derived from a system using dynamic cepstral features with CMN and AGC-max, this transformation can be easily extended to other cepstral-based systems. SRT, in accordance with the present invention, advantageously, achieves a WER upon transformation between different sampling rates of the system and test data comparable to a WER of a system and test data with the same sampling rate.

Having described preferred embodiments of system and method for sampling rate transformation in speech recognition (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for transforming a sampling rate in speech recognition systems comprising the steps of:
   providing cepstral based data including utterances comprised of segments at a reference frequency, the segments being represented by cepstral vector coefficients;
   converting the cepstral vector coefficients to energy bands in logarithmic spectra;
   filtering the energy bands of the logarithmic spectra to remove energy bands having a frequency above a predetermined portion of a target frequency; and
   converting the filtered logarithmic spectra to modified cepstral vector coefficients at the target frequency the target frequency being different than the reference frequency.

2. The method as recited in claim 1, wherein each energy band is associated with a mel-filter, and the step of filtering further includes the step of:
   rescaling the mel-filters.

3. The method as recited in claim 1, wherein the step of converting the cepstral vector coefficients to energy bands in logarithmic spectra includes converting the cepstral vector coefficients to energy bands in logarithmic spectra by employing an inverse discrete cosine transform (IDCT).

4. The method as recited in claim 1, wherein the step of filtering the energy bands includes the step of filtering the energy bands to remove energy bands above one-half the target frequency.

5. The method as recited in claim 1, wherein the step of converting the filtered logarithmic spectra to modified cepstral vector coefficients at the target frequency includes the step of converting the filtered logarithmic spectra to modified cepstral vector coefficients at the target frequency by performing a discrete cosine transform (DCT).

6. The method as recited in claim 1, further comprising the step of estimating maximum and mean values of segment energies at the reference frequency and at the target frequency.

7. The method as recited in claim 6, further comprising the step of outputting a global maximum and mean at the reference frequency for denormalizing system prototypes of a speech recognition system.

8. The method as recited in claim 6, further comprising the step of outputting a global maximum and mean at the target frequency for energy normalization of system prototypes of a speech recognition system.

9. A method for transforming a sampling rate in speech recognition systems comprising the steps of:
   providing system prototypes including distributions of normalized cepstral vectors at a reference frequency;
   denormalizing the normalized cepstral vectors at the reference frequency;
   converting the denormalized to energy bands in logarithmic spectra;
   filtering the energy bands of the logarithmic spectra to truncate energy bands having a frequency above a predetermined portion of a target frequency;
   converting the filtered energy bands to modified cepstral vectors; and
   normalizing the modified cepstral vectors at the target frequency such that the system prototypes are sampled at the target frequency.

10. The method as recited in claim 9, wherein each energy band is associated with a mel-filter, and the step of filtering further includes the step of:
    rescaling the mel-filters.

11. The method as recited in claim 9, wherein the step of converting the denormalized to energy bands in logarithmic spectra includes converting the denormalized to energy bands in logarithmic spectra by employing an inverse discrete cosine transform (IDCT).

12. The method as recited in claim 9, wherein the step of filtering the energy bands includes the step of filtering the energy bands to remove energy bands above one-half the target frequency.

13. The method as recited in claim 9, wherein the step of converting the filtered energy bands to modified cepstral vectors includes the step of converting the filtered energy bands to modified cepstral vectors by performing a discrete cosine transform (DCT).

14. The method as recited in claim 9, wherein the step of denormalizing the normalized cepstral vectors at the reference frequency further comprises the step of inputting global maximum and mean values of segment energies at the reference frequency to denormalize the normalized cepstral vectors of the system prototypes at the reference frequency.

15. The method as recited in claim 9, wherein the step of normalizing the modified cepstral vectors further comprises the step of inputting global maximum and mean values of segment energies at the target frequency to normalize the cepstral vectors of the system prototypes at the target frequency.

16. A program storage device readable by machine, tangibly embodying a program of instructions executable by the machine to perform method steps for transforming a sampling rate in speech recognition systems, the method steps comprising:

provingcepstral based data including utterances comprised of segments at a reference frequency, the segments being represented by cepstral vector coefficients;

converting the cepstral vector coefficients to energy bands in logarithmic spectra;

filtering the energy bands of the logarithmic spectra to remove energy bands having a frequency above a predetermined portion of a target frequency; and converting the filtered logarithmic spectra to modified cepstral vector coefficients at the target frequency, the target frequency being different than the reference frequency.

17. The program storage device as recited in claim 16, wherein each energy band is associated with a mel-filter, and the step of filtering further includes the step of:

rescaling the mel-filters.

18. The program storage device as recited in claim 16, wherein the step of converting the cepstral vector coefficients to energy bands in logarithmic spectra includes converting the cepstral vector coefficients to energy bands in logarithmic spectra by employing an inverse discrete cosine transform (IDCT).

19. The program storage device as recited in claim 16, wherein the step of filtering the energy bands includes the step of filtering the energy bands to remove energy bands above one-half the target frequency.

20. The program storage device as recited in claim 16, wherein the step of converting the filtered logarithmic spectra to modified cepstral vector coefficients at the target frequency includes the step of converting the filtered logarithmic spectra to modified cepstral vector coefficients at the target frequency by performing a discrete cosine transform (DCT).

21. The program storage device as recited in claim 16, further comprising the step of estimating maximum and mean values of segment energies at the reference frequency and at the target frequency.

22. The program storage device as recited in claim 21, further comprising the step of outputting a global maximum and mean at the reference frequency for denormalizing system prototypes of a speech recognition system.

23. The program storage device as recited in claim 21, further comprising the step of outputting a global maximum and mean at the target frequency for energy normalization of system prototypes of a speech recognition system.

24. A program storage device readable by machine, tangibly embodying a program of instructions executable by the machine to perform method steps for transforming a sampling rate in speech recognition systems, the method steps comprising:

providing system prototypes including distributions of normalized cepstral vectors at a reference frequency;

denormalizing the normalized cepstral vectors at the reference frequency;

converting the denormalized to energy bands in logarithmic spectra;

filtering the energy bands of the logarithmic spectra to truncate energy bands having a frequency above a predetermined portion of a target frequency;

converting the filtered energy bands to modified cepstral vectors; and normalizing the modified cepstral vectors at the target frequency such that the system prototypes are sampled at the target frequency.

25. The program storage device as recited in claim 24, wherein each energy band is associated with a mel-filter, and the step of filtering further includes the step of:

rescaling the mel-filters.

26. The program storage device as recited in claim 24, wherein the step of converting the denormalized to energy bands in logarithmic spectra includes converting the denormalized to energy bands in logarithmic spectra by employing an inverse discrete cosine transform (IDCT).

27. The program storage device as recited in claim 24, wherein the step of filtering the energy bands includes the step of filtering the energy bands to remove energy bands above one-half the target frequency.

28. The program storage device as recited in claim 24, wherein the step of converting the filtered energy bands to modified cepstral vectors includes the step of converting the filtered energy bands to modified cepstral vectors by performing a discrete cosine transform (DCT).

29. The program storage device as recited in claim 24, wherein the step of denormalizing the normalized cepstral vectors at the reference frequency further comprises the step of inputting global maximum and mean values of segment energies at the reference frequency to denormalize the normalized cepstral vectors of the system prototypes at the reference frequency.

30. The program storage device as recited in claim 24, wherein the step of normalizing the modified cepstral vectors further comprises the step of inputting global maximum and mean values of segment energies at the target frequency to normalize the cepstral vectors of the system prototypes at the target frequency.

* * * * *